Figure 1:
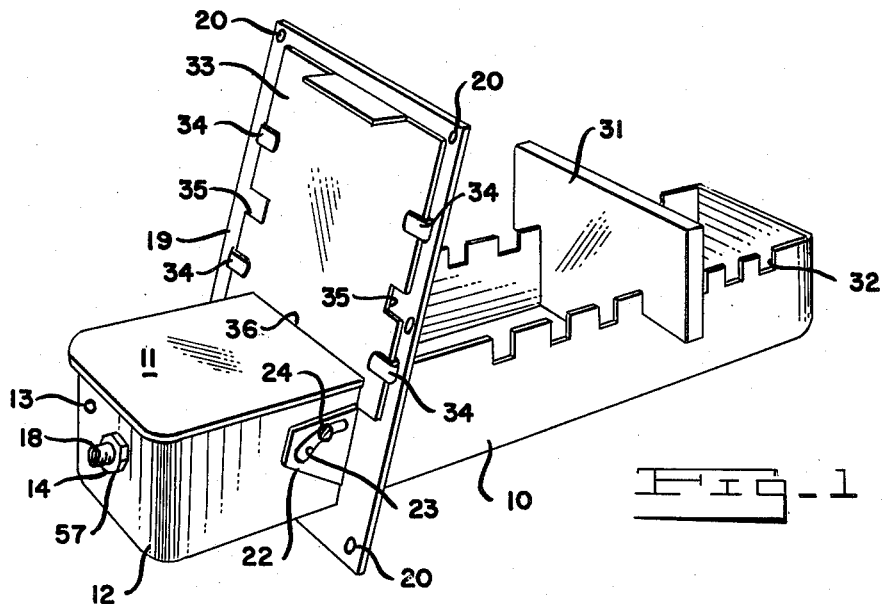

Aug. 4, 1959

M. PERLMAN 2,897,815

HUMIDIFIERS

Filed Sept. 19, 1957

4 Sheets-Sheet 1

INVENTOR.
MILTON PERLMAN
BY
Cullen & Canton
ATTORNEYS

Aug. 4, 1959    M. PERLMAN    2,897,815
HUMIDIFIERS
Filed Sept. 19, 1957    4 Sheets-Sheet 2
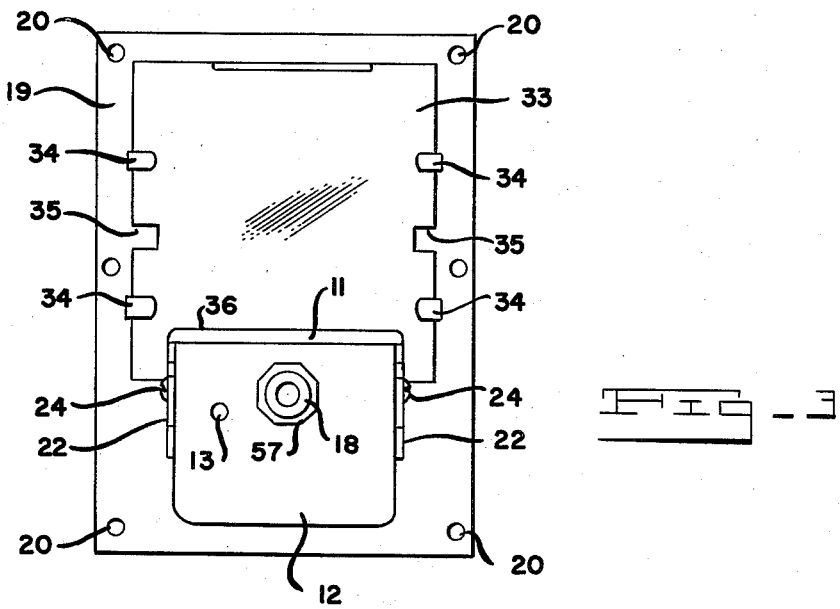
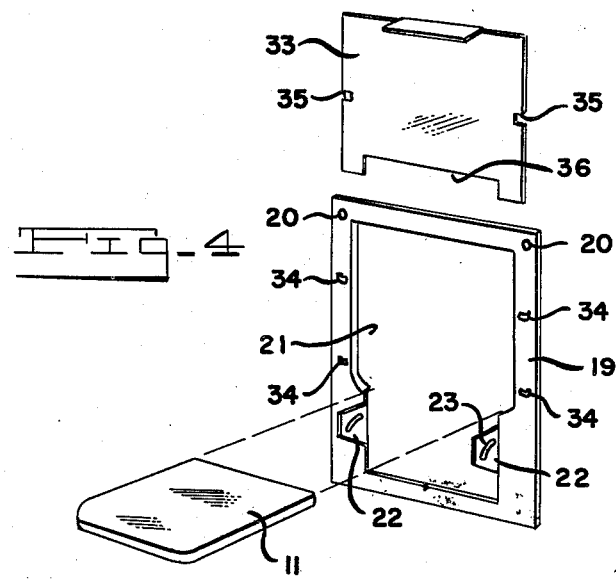
INVENTOR.
MILTON PERLMAN
BY
ATTORNEYS Aug. 4, 1959  M. PERLMAN  2,897,815
HUMIDIFIERS Filed Sept. 19, 1957  4 Sheets-Sheet 3

INVENTOR.
MILTON PERLMAN
BY Cullen & Canton
ATTORNEYS

Aug. 4, 1959    M. PERLMAN    2,897,815
HUMIDIFIERS
Filed Sept. 19, 1957    4 Sheets-Sheet 4
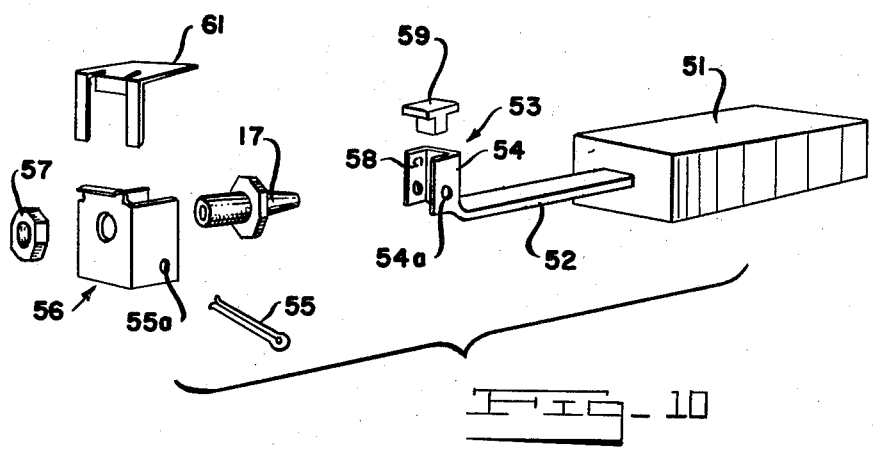
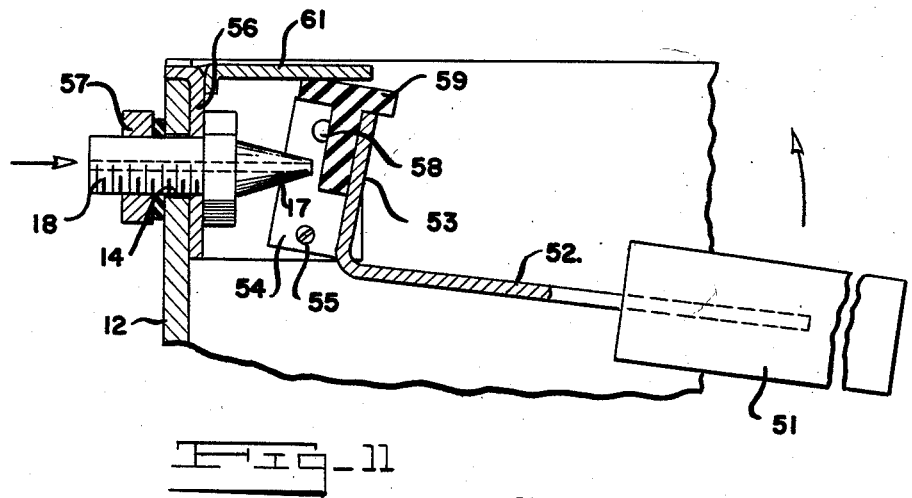
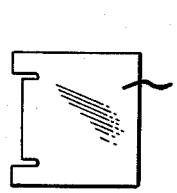
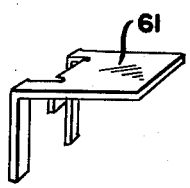
INVENTOR.
MILTON PERLMAN
BY *Cullen & Cantor*
ATTORNEYS

United States Patent Office 2,897,815
Patented Aug. 4, 1959

2,897,815

HUMIDIFIERS

Milton Perlman, Detroit, Mich., assignor to Auto-Flo Corporation, Detroit, Mich.

Application September 19, 1957, Serial No. 684,882

1 Claim. (Cl. 126—113)

This application relates to humidifiers, examples of which are shown in United States Patents 2,709,427, 2,709,428, and 2,709,429 of May 31, 1955, and in my United States patent application Ser. No. 642,688, filed February 27, 1957 and now Patent 2,831,477 of April 22, 1958.

A principal object of the present invention is to provide a novel humidifier of the float control type arranged for mounting in a furnace wall which is constructed to provide a double opening in the wall, the lower part of which is occupied by the humidifier pan, and the upper part of which provides an access and inspection opening above the pan.

Another object is to provide an extremely simple and economical humidifier construction wherein the body is formed as a pan which serves as the water pan for the device, as contrasted from my previous construction wherein there is a body mounted in a mounting plate and which in turn supports the water pan as a separate element. In the present construction a single water pan itself forms the body of the device as well as the water pan.

A still further object is to provide a humidifier which is adjustably mounted to enable the water pan to be mounted horizontally regardless of the slope or verticality of the furnace wall in which the humidifier is mounted.

A still further object is to provide a novel construction employing a rubber stopper removably carried by the float arm and adapted to be pressed against the water supply nozzle of the humidifier of the float control type wherein the construction is so designed that the rubber stopper is easily accessible for renewal and replacement, being merely inserted into the proper place through the open top of the water pan forwardly of the furnace wall, with the stopper being pressed in place against the nozzle by the float arm of the float control means.

A still further object is to provide a humidifier having a mounting plate of ring form in the lower part of which is disposed the water pan and the upper part of which provides an access opening into the interior of the furnace and into the rear of the water pan, with a vertical cover plate over the access opening being formed for quick and easy attachment to the mounting plate horizontally from the front of the furnace wall and requiring very little vertical movement and thus enabling the construction to be used in places where there is inadequate vertical clearance above the mounting plate, as for example where there is a beam or duct immediately above the humidifier.

Still further objects of the invention will presently be understood upon reference to the following detailed description taken in connection with the accompanying drawings.

Figure 2:
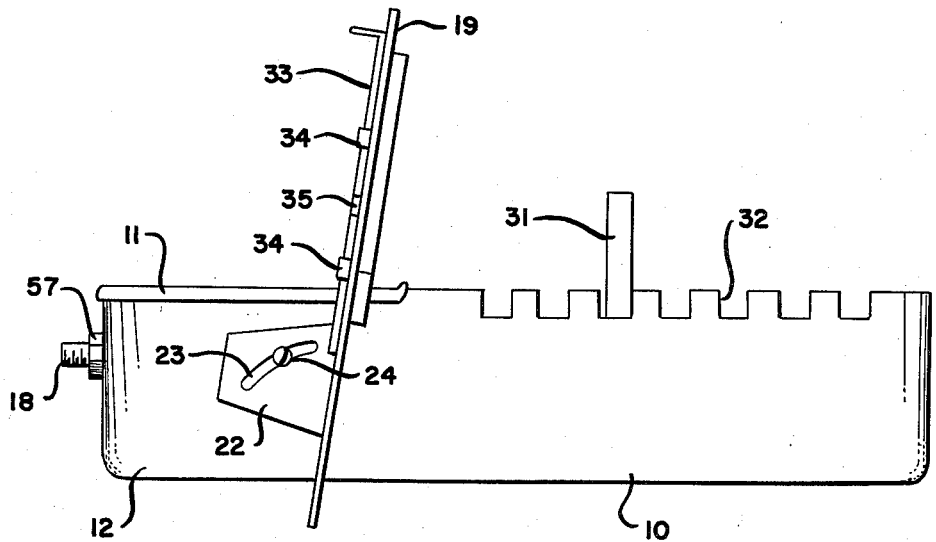
Figure 5:
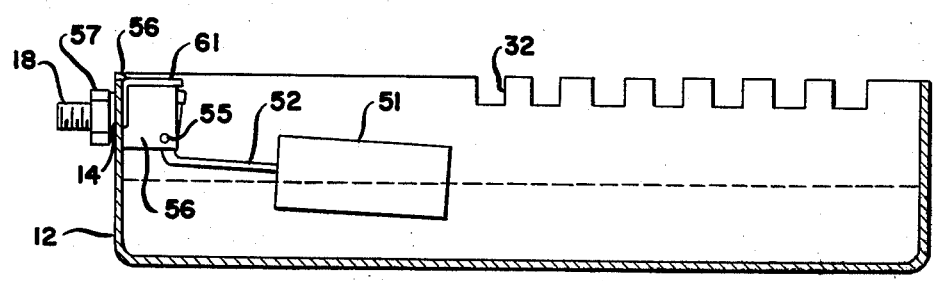
Figure 6:
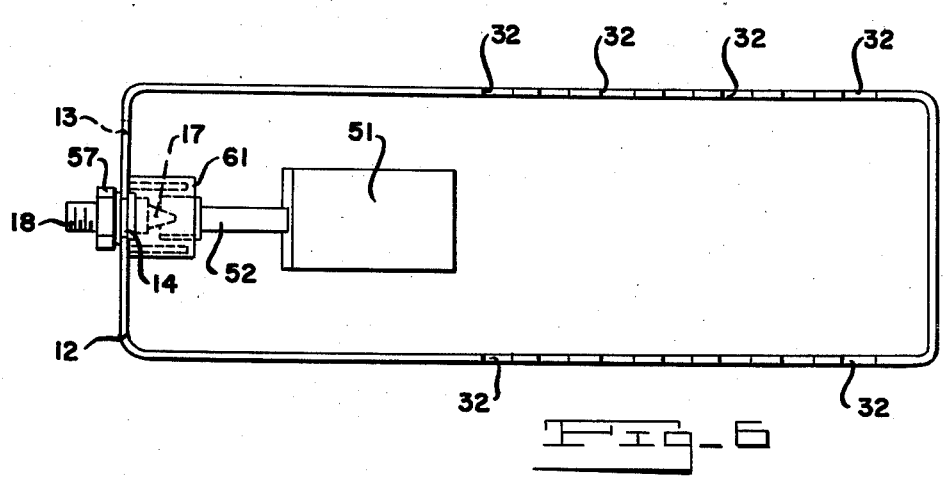
Figures 7, 8, 9:
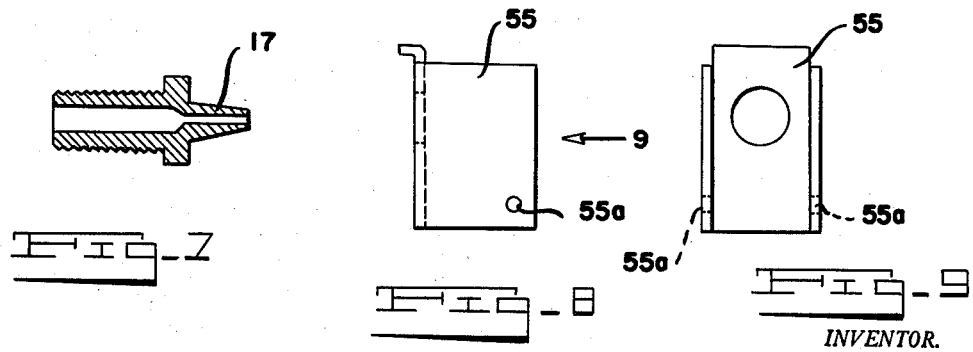

In these drawings:

Fig. 1 is a perspective view of one embodiment;
Fig. 2 is a side view;
Fig. 3 is an end view, as if from the left of Fig. 2;
Fig. 4 is an exploded view showing the cooperation of a horizontal cover and a vertical cover with a mounting plate;
Fig. 5 is a side section view;
Fig. 6 is a top plan view as if looking down on Fig. 5;
Fig. 7 shows a nozzle of the humidifier in section;
Fig. 8 is a side view of a stirrup for mounting the float arm;
Fig. 9 is a view of the stirrup as if from the right of Fig. 8;
Fig. 10 is an exploded view of the float parts;
Fig. 11 is an enlarged fragmentary side section view of the float parts;
Fig. 12 is a top plan view of an anti-splash shield; and
Fig. 13 is a perspective view of the anti-splash shield.

Referring to the drawings, it will be observed that they show a pan 10 which is elongated and has a horizontal bottom, an open top and vertical sides and ends, with the forward part of the open top being adapted to be closed by a snap-on cover 11.

End 12 of the pan has an overflow opening 13 and also an opening 14 in which is mounted a nozzle 17 to which is connected a water supply line 18 discharging into the pan through the nozzle.

For supporting the pan in an opening in a furnace wall there is provided a mounting plate 19 of ring form which is adapted to be secured by screws in holes 20 against an apertured wall of a furnace or duct. Plate 19 is generally rectangular and has a large opening 21, the lower part of which is somewhat smaller than the upper part. The lower part is dimensioned for snugly receiving the pan and has forwardly bent lugs 22 having arcuate slots 23 through which pass screws 24, these screws threading through holes in the sides of the pan and being secured by nuts inside the pan. Screws 24 securely clamp the pan and mounting ring relatively in adjusted position as permitted by the arcuate formation of the slots. Such adjustment enables the pan to be mounted truly horizontal even though the furnace wall is out of vertical and the mounting ring is adjusted out of vertical to correspond. Once the parts are in adjusted position and the screws are tightened up, the parts will remain with the pan horizontal regardless of the verticality of the furnace wall and the mounting ring.

The upper part of the opening in the mounting plate or ring provides an access or inspection opening into the furnace wall in order to give access to the space above the pan inside the furnace and thus give access to evaporator plates 31 seated in notches 32 of the edges of the pan for inspection and removal of such plates through the access opening in the mounting plate.

The mounting plate opening 21 is closed by a removable cover 33 mounted on the sides of the mounting plate by tongues 34 formed on the mounting ring and clamping the vertical edges of the cover 33. Slots 35 in the edges of the cover enable the cover to be applied horizontally from forward of the furnace wall and then to be moved downwardly and thus enable the cover to be applied to a mounting plate despite inadequate clearance or head room above the mounting plate, as for example, if there is a duct or beam close to the humidifier. The lower edge 36 of the cover plate 33 engages the upper surface of the snap-on cover 11 and thus securely clamps this cover 11 in place, as well as clamping itself in place by friction with the tongues 34 of the mounting ring.

It will be observed that the pan, disposed in the lower part of the opening in the mounting ring 19, and held in place by screws 24, is further clamped in place by the access cover 33 so that the pan is held tightly in place once mounted and need never be disturbed, even while the evaporator plates, the nozzle, the rubber stopper and the pan itself are serviced. Service of all the parts may be provided through the openings normally closed by covers 11 and 33 and thus, in effect, all parts may be serviced with the pan permanently mounted in place and the water line permanently fastened to the pan and never again disturbed.

Within the pan there is a float 51 in the form of a block of extremely light weight foam glass secured to the end of a float control arm or bell crank 52 whose forward end 53 is bent upwardly and has wings 54 through holes 54a of which passes a cotter pin 55, the latter also passing through holes 55a in a stirrup 56 positioned against the rear surface of the front end 12 of the pan 10 and held in place by the nut 57 which also secures the nozzle 17 in the opening 14 of the front end of the pan, whereby the nozzle and the mounting for the float arm are securely connected to each other and mounted in the box.

The cotter pin 55 pivotally mounts the float arm.

The wings 54 have indentations 58 which friction grip a rubber stopper 59 adapted to be removably positioned in the upper end of the float arm between the wings, with the stopper being positioned between the float arm and the nozzle and being carried by the float arm. The stopper 59 is easily removable and replaceable through the open upper top of the pan, when cover 11 is removed.

Removably positioned and held in place, simply by friction, above the stopper and nozzle is an anti-splash shield 61 which normally covers the nozzle 17 and stopper 59 to prevent upward splash but which may easily be removed when it is desired to replace the stopper. Normally, however, the anti-splash shield remains held in the mounting stirrup 56 of the pan by friction.

The snap-on cover 11 may be removed for giving access into the forward end of the pan, but normally covers the forward part of the pan, i.e., that part of the pan which is forward of the furnace wall and mounting ring, which has been described, which mounts the pan. The uncovered part of the pan is behind the furnace wall, and hence needs no covering.

Now having described the humidifier construction herein disclosed, reference should be had to the claim which follows.

I claim:

In a humidifier, an open top horizontally disposed water pan having means extending through one of its walls for supplying water thereto, a substantially vertically disposed mounting frame between the ends of and surrounding the pan, means securing the pan in the frame whereby the frame, when mounted on a furnace, can mount the pan in an opening thereof with a front part of the pan outside of and in front of the furnace and a rear part of the pan inside of the furnace, said rear part having means for supporting evaporator plates thereon, the frame having an access opening extending upwardly from the pan, the access opening being of a size to permit ready access to and removal of the evaporator plates, a removable pan cover rested on the open top of the front part of the pan and covering said front part open top and extending through the mounting frame, and an access cover removably mounted on the frame for covering the access opening and having its lower edge rested upon and engaging and thus holding said removable pan cover down on said pan, said access cover being mounted on said frame by a means permitting up and down adjustment of the access cover and the forward removal of it from said frame.

References Cited in the file of this patent

UNITED STATES PATENTS

| | | |
|---|---|---|
| 1,271,587 | Kraker | July 9, 1918 |
| 2,565,210 | Dovolis | Aug. 21, 1951 |
| 2,585,764 | Getz | Feb. 12, 1952 |
| 2,749,933 | Perlman | June 12, 1956 |
| 2,820,448 | Hansen | Jan. 21, 1958 |